(12) United States Patent
Croix (10) Patent No.: US 7,191,414 B1
(45) Date of Patent: *Mar. 13, 2007

(54) APPARATUS AND METHODS FOR INTERCONNECT SIMULATION IN ELECTRONIC CIRCUITRY USING NON-UNIFORM TIME STEP

(75) Inventor: John F. Croix, Austin, TX (US)

(73) Assignee: Nascentric, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/196,129

(22) Filed: Aug. 3, 2005

Related U.S. Application Data

(63) Continuation-in-part of application No. 10/465,540, filed on Jun. 19, 2003, now Pat. No. 7,013,440.

(60) Provisional application No. 60/389,997, filed on Jun. 19, 2002.

(51) Int. Cl.
*G06F 17/50* (2006.01)

(52) U.S. Cl. .................................. 716/4; 716/6

(58) Field of Classification Search .................... 716/1, 716/4–6, 10, 18
See application file for complete search history.

(56) References Cited

U.S. PATENT DOCUMENTS 5,373,457 A  12/1994  George et al.
5,857,164 A  1/1999  Wakita
6,789,237 B1  9/2004  Ismail
7,013,440 B2  3/2006  Croix

OTHER PUBLICATIONS

Chen, "Path Sensitization in Critical Path Problem," IEEE Transactions On Computer Aided Design of Integrated Circuits and Systems, vol. 12, No. 2, Feb. 1993, pp. 196-207.
Dartu, et al., "TETA: Transistor-Level Engine for Timing Analysis," 35th Design Automation Conference, 1998, 4 pages.
Croix, et al., "A Fast and Accurate Technique to Optimize Characterization Tables for Logic Synthesis," 34th Design Automation Conference, 1997, 4 pages.
Dartu, et al., "Calculating Worst-Case Gate Delays Due to Dominant Capacitance Coupling," 34th Design Automation Conference, 1997, 6 pages.
Lam, et al., "Exact Minimum Cycle Times for Finite State Machines," Proceedings of the 31st IEEE/ACM Design Automation Conference, Jun. 1994, 6 pages.

(Continued)

*Primary Examiner*—Paul Dinh
(74) *Attorney, Agent, or Firm*—Lawrence J. Merkel; Meyertons, Hood, Kivlin, Kowert & Goetzel, P.c.

(57) ABSTRACT

In one embodiment, a system comprises a computer. The computer is configured to generate a plurality of partial sums corresponding to a first time point of a response on an interconnect, and generate the response at the first time point as a sum of the partial sums. The plurality of partial sums are a function of at least: one or more poles and residues of the interconnect and a time step; wherein at least a first partial sum of the plurality of partial sums is also a function of the first partial sum calculated for a second time point that precedes the first time point.

18 Claims, 5 Drawing Sheets

OTHER PUBLICATIONS

O'Brien, et al., "Modeling The Driving-Point Characteristic of Resistive Interconnect for Accurate Delay Estimation," IEEE, 1989, pp. 512-515.

Pillage, et al., "Asymptotic Waveform Evaluation for Timing Analysis," IEEE Transactions on Computer Aided Design, vol. 9, No. 4, Apr. 1990, pp. 352-366.

Qian, et al., "Modeling the "Effective Capacitance" For the RCE Interconnect of CMOS Gates," IEEE Transaction On Computer Aided Design of Integrated Circuits and Systems, vol. 13, No. 12, Dec. 1994, pp. 1526-1535.

Ratzlaff, et al., "RICE: Rapid Interconnect Circuit Evaluation Using AWE", IEEE Transactions on Computer Aided Design of Integrated Circuits and Systems, vol. 13, No. 6, Jun. 1994, pp. 763-776.

Silveira, et al., "Efficient Reduced-Order Modeling of Frequency-Dependent Coupling Inductances Associated with 3-D Interconnect Structures," $32^{nd}$ ACM/IEEE Design Automation Conference, 1995, 5 pages.

Dartu, et al., "A Gate-Delay Model for High-Speed CMOS Circuits," $31^{st}$ ACM/IEEE Design Automation Conference, 1994, 5 pages.

McDonald, et al., "Computing Logic-Stage Delays Using Circuit Simulation and Symbolic Elmore Analysis," $38^{th}$ ACM Design Automations Conference, 2001, 283-288.

Sun, et al., "Efficient Timing Analysis for CMOS Circuits Considering Data Dependent Delays," IEEE Transactions on Computer Aided Design of Integrated Circuits and Systems, vol. 17, No. 6, Jun. 1998, pp. 546-552.

Dartu, et al., "Performance Computation for Precharacterized CMOS Gates with RC Loads," IEEE Transactions on Computer Aided Design of Integrated Circuits and Systems, vol. 15, No. 5, May 1996, pp. 544-553.

Chen, et al., "A New Gate Delay Model for Simultaneous Switching and Its Applications," $38^{th}$ ACM Design Automation Conference, 2001, pp. 289-294.

Arunachalam, et al., "CMOS Gate Delay Models for General RLC Loading," IEEE International Conference on Computer Design, VLSI In Computers and Processors, 1997, 6 pages.

Yalcin, et al., "Fast and Accurate Timing Characterization Using Functional Information," IEEE Transactions on Computer Aided Design of Integrated Circuits and Systems, vol. 20, No. 2, Feb. 2001, pp. 315-331.

Shih, et al., "ILLIADS: A Fast Timing and Reliability Simulator for Digital MOS Circuits," IEEE Transactions on Computer Aided Design of Integrated Circuits and Systems, vol. 12, No. 9, Sep. 1993, pp. 1387-1402.

Ngoya, et al., Newton-Raphson Iteration Speed-Up Algorithm for the Solution of Nonlinear Circuit Equations in General-Purpose CAD Programs, IEEE Transactions on Computer Aided Design of Integrated Circuits and Systems, vol. 16, No. 6, Jun. 1997, pp. 638-644.

Acar, et al., "TETA: Transistor-Level Waveform Evaluation for Timing Analysis," IEEE Transactions on Computer Aided Design of Integrated Circuits and Systems, vol. 21, No. 5, May 2002, pp. 605-616.

Devgan, et al., "Adaptively Controlled Explicit Simulation," IEEE Transactions on Computer Aided Design of Integrated Circuits and Systems, vol. 13, No. 6, Jun. 1994, pp. 746-762.

Liu, et al. "Ftd: An Exact Frequency to Time Domain Conversion for Reduced Order RLC Interconnect Models," $35^{th}$ Design Automation Conference, 1998, 4 pages.

Bracken, et al., Interconnect Simulation with Asymptotic Waveform Evaluation (AWE), IEEE Transactions on Circuits and Systems-1: Fundamental Theory and Applications, vol. 39, No. 11, Nov. 1992, pp. 869-878.

Odabasioglu, et al., "PRIMA: Passive Reduced-Order Interconnect Macromodeling Algorithm," IEEE, 1997, 8 pages.

Alpert, et al., "RC Delay Metrics for Performance Optimization," IEEE Transactions on Computer Aided Design of Integrated Circuits and Systems, vol. 20, No. 5, May 2001, pp. 571-582.

Ratzlaff, et al., "Modeling the RC-Interconnect Effects in a Hierarchical Timing Analyzer," IEEE Custom Integrated Circuits Conference, 1992, 4 pages.

Raghavan, et al., "A New Nonlinear Driver Model for Interconnect Analysis," $28^{th}$ ACM/IEEE Design Automation Conference, 1991, pp. 561-566.

Kashyap, et al., "An "Effective" Capacitance Based Delay Metric for RC Interconnect," IEEE, 2000, pp. 229-234.

Khang, et al., "An Analytical Delay Model for RLC Interconnects," IEEE Transactions on Computer Aided Design of Integrated Circuits and Systems, vol. 16, No. 12, Dec. 1997, pp. 1507-1514.

Kam, et al., "EDA Challenges Facing Future Microprocessor Design," IEEE Transactions on Computer Aided Design of Integrated Circuits and Systems, vol. 19, No. 12, Dec. 2000, pp. 1498-1506.

Hitchcock, et al., "Timing Analysis of Computer Hardware," IBM J. Res. Develop., vol. 26, No. 1, Jan. 1982, pp. 100-105.

Darringer, et al., "EDA In IBM: Past, Present, and Future," IEEE Transactions on Computer Aided Design of Integrated Circuits and Systems, vol. 19, No. 12, Dec. 2000, pp. 1476-1497.

Kobayashi, et al., "Delay Abstraction in Combinational Logic Circuits," IEEE Transactions on Computer Aided Design of Integrated Circuits and Systems, vol. 16, No. 10, Oct. 1997, pp. 1205-1212.

Chatzigeorgiou, et al. "A Modeling Technique for CMOS Gates," IEEE Transactions on Computer Aided Design of Integrated Circuits and Systems, vol. 18, No. 5, May 1999, pp. 557-575.

Hirata, et al., "Proposal of a Timing Model for CMOS Logic Gates Driving a CRC $\pi$ Load", ACM Conference, 1998, pp. 537-544.

Jen, et al., "A Compact and Unified MOS DC Current Model with Highly Continous Conductances for Low-Voltage IC's", IEEE Transactions on Computer Aided Design of Integrated Circuits and Systems, vol. 17, No. 2, Feb. 1998, pp. 169-172.

Hafed, et al., "Delay and Current Estimation ina CMOS Inverter with an RC Load," IEEE Transactions on Computer Aided Design of Integrated Circuits and Systems, vol. 20, No. 1, Jan. 2001, pp. 80-89.

Korshak, et al., "An Effective Current Source Cell Model for VDSM Delay Calculation," IEEE, 2001, pp. 296-300.

Keller, et al., "A Robust Cell-Level Crosstalk Delay Change Analysis," ACM/IEEE International Workshop on Timing Issues in the Specification and Synthesis of Digital Systems, Feb. 2004, 9 pages.

Rubinstein, et al., "A Robust Cell-Level Crosstalk Delay Change Analysis," ACM/IEEE International Workshop on Timing Issues in the Specification and Synthesis of Digital Systems, Feb. 2004, 9 pages.

Cormen, et al., "Introduction to Algorithms," McGraw-Hill, Inc., 1990, pp. 762-765.

Press, et al., "Numerical Recipes In C: The Art of Scientific Computing," Cambridge University Press, Second Edition, 1993, pp. 104-110.

McCalla, "Fundamentals of Computer-Aided Circuit Simulation," Kluwer Academic Publications, 1988, pp. 107-112.

Kong, et al., "Digital Timing Macromodeling for VLSI Design Verification," Klumer Academic Publishers, 1995, pp. 1-8.

Croix, et al., "Blade and Razor: Cell and Interconnect Delay Analysis Using Current-Based Models," Design Automation Conference, Jun. 2003, 4 pages.

Elmore, "The Transient Response of Damped Linear Networks with Particular Regard to Wideband Amplifiers," Journal of Applied Physics, vol. 19, Jan. 1948, pp. 55-63.

Matson, et al., "Macromodeling and Optimization of Digital MOS VLSI Circuits," IEEE Transactions on Computer-Aided Design, vol. CAD-5, No. 4, Oct. 1986, pp. 659-678.

Monachino, "Design Verification System for Large-Scale LSI Designs," IEEE $19^{th}$ Design Automation Conference, 1982, pp. 83-90.

Synopsys, Inc., Library Compiler Reference Manual, vol. 2, Rev. 3.3b, Appendix D, 1999, pp. 1-102.

Ousterhout, "A Switch-Level Timing Verifier for Digital MOS VLSI," IEEE Transactions on Computer-Aided Design, vol. CAD-4, No. 3, Jul. 1985, pp. 336-349.

Chawla, et al., "MOTIS-An MOS Timing Simulator," IEEE Transactions on Circuits and Systems, vol. CAS-22, No. 12, Dec. 1975, pp. 901-910.

Ho, et al., "The Modified Nodal Approach to Network Analysis," IEEE Transactions on Circuits and Systems, vol. CAS-22, No. 6, Jun. 1975, pp. 504-509.

Kundert, "Sparse Matrix Techniques," Circuit Analysis, Simulation and Design, Advances in CAD for VLSI, vol. 3, Part 1, 1986, 45 pages.

Maron, "Methods for Finding Roots of f(x)," Numerical Analysis: A Practical Approach, Sec. 2.2, 1982, pp. 53-57.

Horowitz, et al., "Dynamic Programming," Fundamentals of Computer Algorithms, 1978, pp. 198-203.

Pillage, et al., "Electronic Circuit and System Simulation Methods," Linear Transient Analysis, 1995, 41 pages.

APPARATUS AND METHODS FOR INTERCONNECT SIMULATION IN ELECTRONIC CIRCUITRY USING NON-UNIFORM TIME STEP

CROSS-REFERENCE TO RELATED APPLICATIONS

This patent application is a continuation-in-part of U.S. patent application Ser. No. 10/465,540, filed Jun. 19, 2003 now U.S. Pat. No. 7,013,440, which claims priority to provisional U.S. Patent Application Ser. No. 60/389,997, filed on Jun. 19, 2002. The above applications are incorporated herein by reference in their entireties.

TECHNICAL FIELD OF THE INVENTION

This invention relates to characterizing electronic circuits and, more particularly, to characterizing electronic circuits via current-based circuit characterization models and to interconnect models for characterizing interconnects in electronic circuitry.

BACKGROUND

Complexity of a typical electronic circuit, for example, an integrated-circuit device, has increased dramatically. At the same time, the length of the design cycle has typically remained unchanged or has become shorter. To meet the shorter design cycles for the more complex designs, circuit designers increasingly rely on characterization of the designs in order to identify any problems early in the design cycle. The short design cycles and the complexity of the integrated-circuit devices make cost- and time-prohibitive an approach that characterizes a design by actually realizing the design in hardware and testing it in a laboratory.

As an alternative to actually building a prototype of the design, circuit designers have increasingly relied on electronic design automation (EDA) tools, such as circuit simulation and characterization tools. Effective circuit simulation tools provide a way for the designer to simulate the behavior of a complex design, identify any problems, and make alterations and enhancements to the circuit before arriving at a final design. That iterative design process has in turn improved the reliability of the end products that incorporate a given circuit design.

The effectiveness of a circuit characterization or simulation tool depends on several criteria, for example, accuracy and efficiency. Traditional approaches to characterizing circuits sometimes fail to meet those criteria. In other words, the traditional approaches may fail to provide results that match the behavior of an actual prototype relatively closely. Alternatively, or in addition, traditional approaches may prove inefficient, i.e., they may use relatively large computing resources, take relatively long times, or both. The failure of the traditional characterization techniques results in increased costs, longer design cycles, less reliable end products, and/or less-than-optimal designs. A need therefore exists for accurate and efficient techniques for circuit characterization.

SUMMARY

In one embodiment, a system comprises a computer. The computer is configured to generate a plurality of partial sums corresponding to a first time point of a response on an interconnect, and generate the response at the first time point as a sum of the partial sums. The plurality of partial sums are a function of at least: one or more poles and residues of the interconnect and a time step; wherein at least a first partial sum of the plurality of partial sums is also a function of the first partial sum calculated for a second time point that precedes the first time point. A method and a computer readable medium embodying instructions that implement the method, when executed, are also contemplated embodiments.

DESCRIPTION OF THE DRAWINGS

The appended drawings illustrate only exemplary embodiments of the invention and therefore should not limit its scope. The disclosed inventive concepts lend themselves to equally effective embodiments other than the exemplary embodiments shown in the drawings. The same numerals used in more than one drawing denote the same, similar, or equivalent functionality, components, circuitry, or blocks, unless stated otherwise.

DETAILED DESCRIPTION

An apparatus and methods for characterizing electronic circuits is contemplated. More particularly, some embodiments relate to ways of characterizing electronic circuits using current-based models.

The apparatus and methods may provide novel ways of modeling for electronic circuits, including modeling of cells and related interconnect. The apparatus and methods may provide circuit designers with tools for improved circuit modeling and, therefore, may solve the problems of inaccurate or relatively inefficient modeling of electronic circuits, in some embodiments.

Design and implementation of a modern electronic circuit typically involves characterization of the circuit. Generally, circuit or cell characterization refers to the process of determining a circuit's or cell's response to various external conditions. Put another way, characterization constitutes the acquisition of a set of measurements that predict how a real implementation (i.e., an implementation in actual hardware, for example, on an integrated circuit device) of the circuit will behave in response to a stimulus or stimuli.

In a given design, for example, a circuit designed for implementation on an integrated circuit device, usually includes modules or cells. Each cell or module typically constitutes a circuit that includes a collection of circuit elements, for example, transistors, diodes, resistors, and the like. One may characterize the cells in a given design to determine various cell qualities or attributes, such as timing and power consumption.

As part of cell characterization, the characterization tool measures the responses of the cell or circuit at one or more characterization points and records those responses in the form of a characteristic equation or, alternatively, a characterization table. A characterization point refers to a specific voltage or current, temperature, and process at which the tool characterizes a cell or circuit.

For a given characterization point, the tool typically measures a cell's response with respect to various input transition times and capacitive loads to determine the cell's behavior. A cell's behavior refers to the way the cell or circuit's output quantity (e.g., voltage) behaves as a function of its input stimulus or stimuli. For example, an AND gate behaves like a logical "and" operation. The behavior determines how a designer will use a cell or circuit, and what measurements a tool should take to predict how the cell or circuit will operate once physically implemented.

The type and amount of measurements a tool takes varies, usually driven by modeling considerations. The desired models for a cell or circuit determine what measurements a tool will take. Measurements may cover various quantities, for example, power and timing. Power measurements determine how much power a cell or circuit consumes as it operates. Power measurements may include leakage power, hidden power, and switching power, etc.

To perform timing characterization, tools typically measure three parameters for each input transition/capacitive load combination: intrinsic delay, output transition time, and input-pin capacitance. Intrinsic delay refers to the delay between the time of input transition and the time of the output transition, often measured between the 50% points of the waveforms that correspond to those quantities. Tools usually measure the output transition time across the most linear region of the output voltage waveform. Characterization tools typically measure transition times between the 10% and 90% or between 20% and 80% points of a voltage waveform.

The input-pin capacitance refers to the intrinsic effective capacitance of an input pin of a cell or circuit. Depending on the cell or circuit, the effective capacitance may vary as a function of the load that the cell drives, as output capacitance may couple back to the input leads or pins of the cell or circuit. The varying effective capacitance changes the amount of time it takes to charge and discharge the effective capacitance and, therefore, impacts the timing of the cell or circuit.

One aspect of some embodiments relates to a new cell characterization model. The new cell model calculates timing characteristics for a cell. Specifically, given a voltage stimulus on an input pin and an arbitrary load on an output pin (capacitive, interconnect, etc.), one may use the model to determine the voltage response at the output pin with near-SPICE accuracy (within 1%–2% typically).

With a small addition, this model can also calculate current flow for the cell (and, thus, power consumption), as desired. With the current flow, input voltage, and output voltages known, one may use the inventive concepts to determine complete timing and power characteristics for the cell.

Unique to this model is its ability to accurately calculate the output voltage using arbitrary input voltages, including noisy voltage waveforms that do not exhibit monotonicity. Furthermore, unlike traditional cell models, the model described herein can drive arbitrary loads (resistors, capacitors, etc.), as well as reduced-order loads (for example, interconnect pre-processed down to poles and residues). As noted above, one may use the inventive concepts to also calculate the power consumption of the cell, as desired.

The inventive concepts provide advantages over traditional techniques and solutions for characterizing electronic circuitry and related interconnect. Models may execute many times faster than HSPICE (the industry standard SPICE). The speeds are at least one order of magnitude faster than other existing models for transient analysis of cells. Furthermore, one may use the inventive concepts to accurately calculate power consumption of a cell once one has calculated the output voltage waveform of the cell. The inventive concepts also provide relatively high accuracy. Error margins are relatively low compared to other non-SPICE models (typically within 1% to 2% of SPICE results).

Furthermore, models described herein can use or consume arbitrary input waveforms. Most other models use a simple line segment (or maybe two segments) to represent the input waveform. Models described herein, however, can consume input voltage descriptions consisting of many points, for example, hundreds or thousands of points. Also, the output signal may be a voltage waveform consisting of many points, not just a few.

In exemplary embodiments, the inventive concepts provide a mechanism for modeling complementary metal oxide semiconductor (CMOS) circuits. Note, however, that one may use the inventive concepts to model other types of circuitry, as desired. Examples include N-type or P-type logic (for example, domino logic), circuitry including other types of transistor, such as silicon-on-insulator circuitry, etc.

As described below, models may include a noise immunity filter. The filter provides a model of the intrinsic noise immunity of a cell and provides for proper modeling of the noise immunity characteristics of the cell.

Furthermore, one may create models for modeling circuitry in which more than just a single input is switching. In computer-aided design (CAD), tools typically provide the ability to characterize cells in which a single input is switching. In contrast, models described herein are not limited to switching of a single input.

Models described herein can accommodate and drive arbitrary loads. The loads can include a simple capacitor, a RC/RCL tree or mesh, a complex topology, or some reduced form (like poles and residues). Generally, if a SPICE transistor model of the gate or cell can drive the load, so can embodiments of the models described herein.

All of the other known current models (for a gate or cell, not a transistor) set the current flow as a function of the input voltage. In contrast, models described herein may create a multi-dimensional voltage-controlled current source, as described below in detail.

Models described herein can account for multiple power supplies (beyond just $V_{SS}$ and $V_{DD}$). Also, the models use a voltage-controlled voltage source to represent the transistors in a single stage of a cell or block.

The models are relatively simple to characterize for and to calibrate. They are simpler, for example, than voltage-based models from Synopsys Incorporated, which are known to persons of ordinary skill in the art. Characterization also occurs relatively fast and uses relatively fewer computing resources (both computer resources and SPICE licenses).

The description presented above assumes CMOS circuitry and assumes that substrate voltage is at $V_{SS}$ and $V_{DD}$. One, however, may extend the models beyond the exemplary embodiments to account for variations in substrate voltage, as desired, by making modifications that fall within the knowledge of persons of ordinary skill in the art who have the benefit of this description.

Models may use the following components: a voltage-controlled current source to represent the current flow through a cell stage's transistors; an internal capacitor, $C_{internal}$, and a time-shift element.

To account for signal integrity, the models may also include a noise immunity filter (implemented in illustrative embodiments as a simple RC filter that preprocesses the input voltage, or as a resistance between the internal capacitor and the load placed on the output terminal of the cell).

Figure 1:
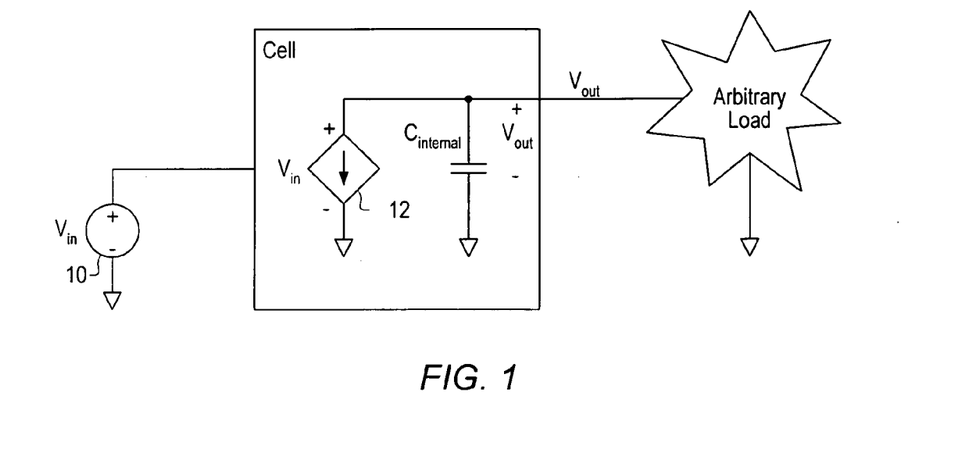
FIG. 1 illustrates a block diagram of an exemplary embodiment of a model according to the invention.

FIG. 1 shows a block diagram of an exemplary embodiment of a model. The model includes voltage-controlled current source 12 (responsive to input voltage source 10), internal capacitor, $C_{internal}$, and a time shift element (not shown explicitly). Note that FIG. 1 does not show the optional noise immunity filter.

One may extract model parameters in three parts: extraction of data to represent the voltage-controlled current source, determination of the internal capacitance and time shift, and determination of the noise immunity filter component values. The following describes each part in detail.

The process of calculating the voltage-controlled current source value is relatively straightforward. Given an arbitrary cell with input pin (or terminal or node) A and output pin (or terminal or node) Y, one performs the following tasks:

Attach a DC voltage supply 10 to pin A (called $V_{in}$).
Attach a DC voltage supply to pin Y (called $V_{out}$).
Set any other input pin (or terminal or node) to $V_{DD}$ or $V_{SS}$ so as to obtain the desired result between pins A and Y. For example, for an AND gate with an additional input pin B might set B at $V_{DD}$ so that transitions on A cause a transition on Y. For power calculations, however, one may also wish to set B at $V_{SS}$.
Attach appropriate power and ground supplies to the cell (e.g., $V_{SS}$ and $V_{DD}$).
Sweep values of $V_{in}$ and $V_{out}$ independently (in a DC simulation of the circuit). For example, measuring or sweeping 16 values of $V_{in}$ and 16 of $V_{out}$ results in 256 different combinations of $V_{in}$ and $V_{out}$. Measure current flow through $V_{out}$ during the sweeps.
To later determine power consumption, also measure the current flow through all $V_{DD}$ and $V_{SS}$ supplies.

The result of the tasks is a two-dimensional table of current flow through $V_{out}$ as a function of $V_{in}$ and $V_{out}$ values. For power characterization, other two-dimensional tables will also result to indicate the current flow through $V_{DD}$ and $V_{SS}$ supplies as a function of $V_{in}$ and $V_{out}$ values.

One may store the resulting data from the DC sweeps in a table or in tables, fit the data to an equation, or both, as desired. Furthermore, one may use a variety of forms for the voltage-controlled current source, as desired, and as persons of ordinary skill in the art who have the benefit of this description understand.

For example, the voltage-controlled current sources may be equation-based or table-based, as desired. The models can use either form. Furthermore, one may replace the voltage-controlled current source with a voltage-controlled resistor tied to $V_{DD}$, as the two components are equivalent to one another. Regardless of the variations in form and choices of implementation, once the tasks have been performed, the measured current represents the current flow through the transistors as a function of $V_{in}$ and $V_{out}$ values.

A resulting model relates an input pin to an output pin. So, for a two-input NAND gate with input pins A and B and output pin Y, one may produce two models. One model would represent the A-to-Y path and the other model the B-to-Y path. As an alternative, one may sweep $V_{in}$ for A, $V_{in}$ for B, and $V_{out}$ for Y independently and have only a single model, as desired.

As noted above, similar to typical circuit simulation and characterization tools, the procedures described characterize a cell or circuit with one input pin or node or terminal switching. As persons of ordinary skill in the art who have the benefit of this description appreciate, however, the procedures are exemplary and illustrative, and one may apply the inventive concepts to situations where more than one input pin is switching, as desired.

Figure 2:
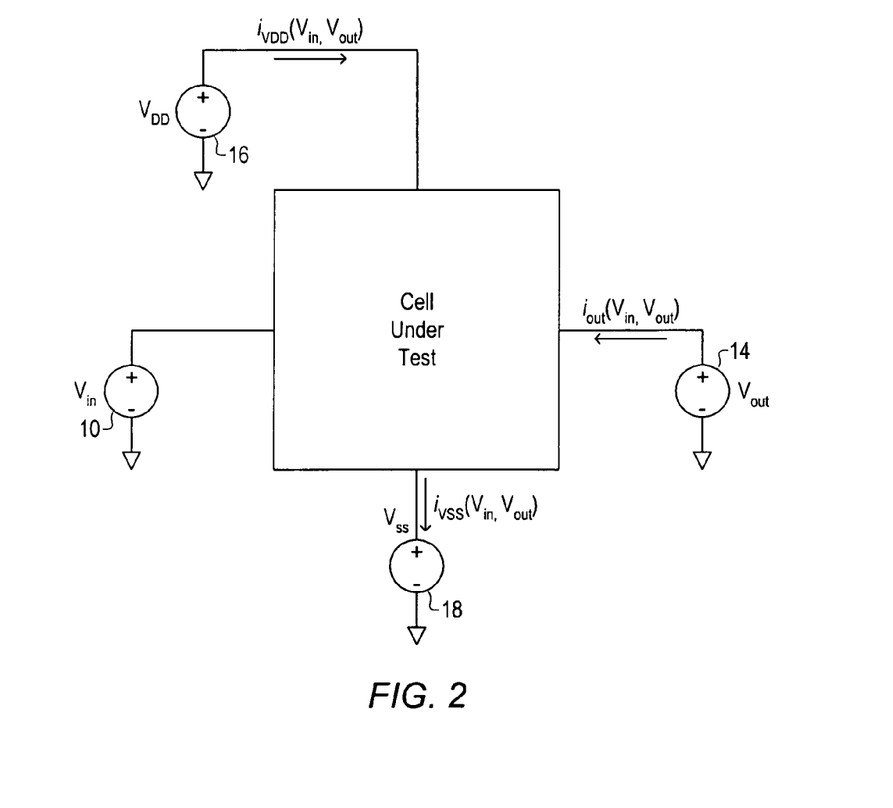
FIG. 2 shows a block diagram of various current and voltage quantities in an exemplary embodiment of a model according to the invention.

FIG. 2 shows a block diagram of various current and voltage quantities in an exemplary embodiment of a model. Voltage source $V_{in}$ 10 drives the cell under test. Power supplies $V_{DD}$ 16 and $V_{SS}$ 18 supply power to the cell. Source $V_{out}$ 14 represents the swept output voltage. As noted above, the model measures or calculates current flow through the output pin $V_{out}$ or $i_{out}$. The current $i_{out}$ is a function of $V_{in}$ and $V_{out}$.

Figure 3:
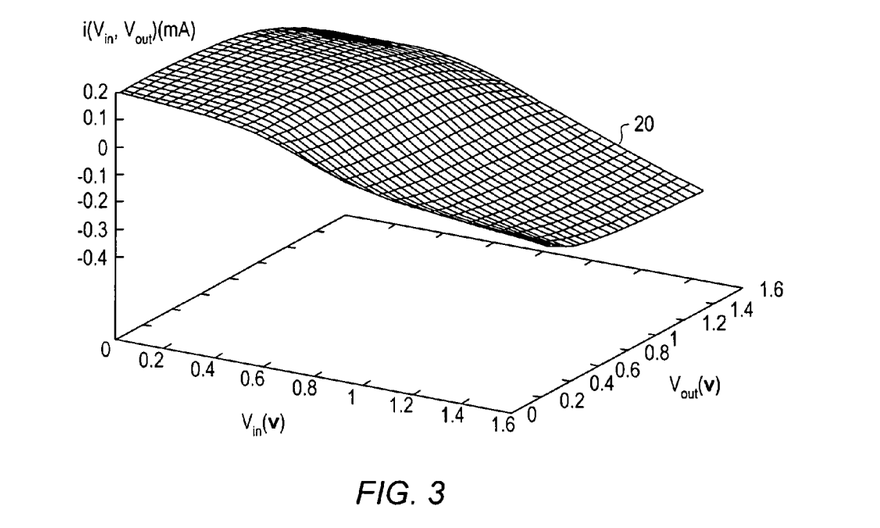
FIG. 3 depicts an example of the output current $i_{out}$ in a cell characterized by a model according to an exemplary embodiment of the invention.

FIG. 3 shows an example of the output current $i_{out}$ in a cell characterized by a model according to an exemplary embodiment. A two-dimensional surface 20 represents the output current values, which are a function of $V_{in}$ and $V_{out}$.

For power analysis, one may also measure or calculate the current flow through the cell's power supplies. Referring to FIG. 2, the currents are $i_{VDD}$ and $i_{VSS}$, respectively. Note that these current values are functions of $V_{in}$ and $V_{out}$. Note further that, if multiple input pins or terminals or nodes are switching, the currents would be a function of more than one input voltage.

Figure 4:
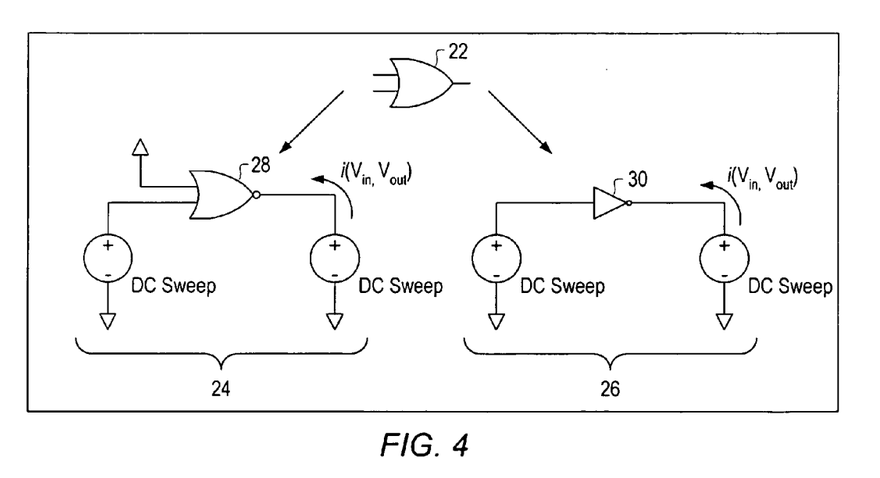
FIG. 4 shows details of characterizing a multi-stage cell using models according to the invention.

For multi-stage cells, one may characterize and analyze each stage separately, as desired. FIG. 4 shows details of characterizing a multi-stage cell using models described herein. More specifically, one may represent a model for OR gate 24 as a model for a NOR gate 28 and a model 26 for an inverter 30. One may characterize NOR gate 28 and inverter 30 (and, hence, OR gate 24) by developing and using model 24 and model 26.

Figure 5:
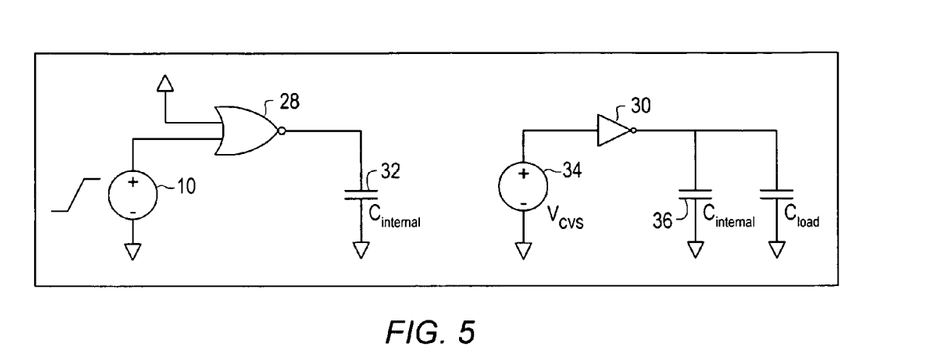
FIG. 5 depicts more details of characterizing a multi-stage cell using models according to the invention.

FIG. 5 shows more details of characterizing a multi-stage cell using models as described herein. More specifically, in order to create a model for a two-stage cell (like OR gate 22 shown in FIG. 4), the two individual gates that make up OR gate 22 are independently created and calibrated. To evaluate OR gate 22, the characterization engine calculates the response of NOR gate 28 and passes the calculated response voltage (represented by the voltage-controlled voltage source 34 or VCVS) to inverter 30 to determine the final gate response.

One may extend these concepts to larger or more complex cells that include a number of stages, as persons of ordinary skill in the art who have the benefit of this description understand. For a larger cell consisting of many stages, one need develop a model for the final gate(s) or stage(s) driving the output(s), although one may create individual models for all single-stage gate or stage components, as desired.

Models may include an internal capacitance and a time-shift element. After the DC current flow has been extracted, a calibration process occurs in which one determines the internal capacitance and the time-shift.

To calibrate, one may run the cell through a simulation program, like SPICE, in which the input pin and output pin make transitions (the same pins for which one develops models). In other words, a voltage swing is placed on the input pin and the output pin is loaded with a simple capacitance. One should use input transition times and capacitive loads in this transient SPICE run suitable for the technology and process being used or represented, as persons of ordinary skill with the benefit of this description understand. The calibration process includes saving the two waveforms at input pin A and output pin Y.

Next, one exercises or applies the model with the derived current source and searches for an internal capacitance value such that the output waveform created by the model matches in shape to the waveform extracted through SPICE simulation, using the same input waveform. One may determine a match by examining the standard deviation between the two waveform values. One may find an acceptable or suitable value for the internal capacitance, $C_{internal}$, by minimizing or reducing the standard deviation. To simplify this process, one may choose to compare the points in the respective waveforms where a transition is taking place.

Once the waveforms match or tend to match, the time distance or separation between the two waveforms determines the time-shift element of the model. Note that a single transient run and calibration is typically sufficient to calibrate models for all inputs and output loads.

Figure 6:
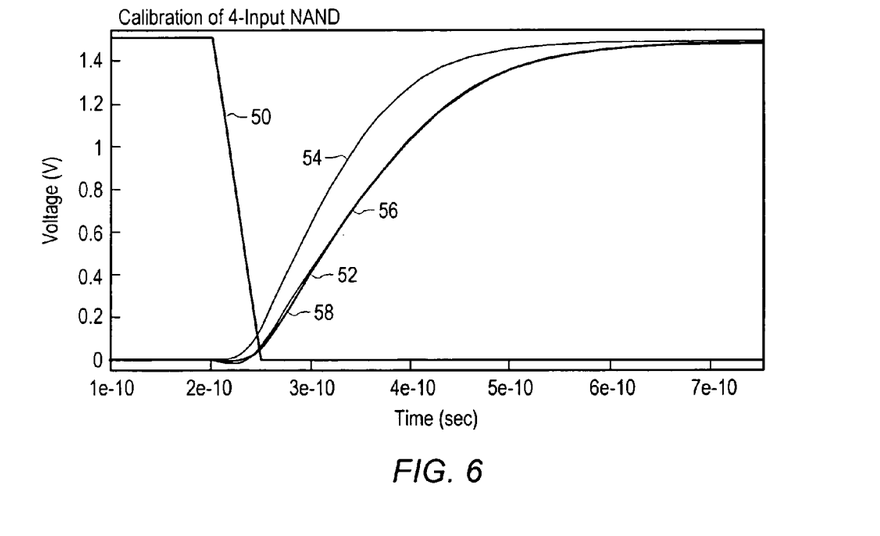
FIG. 6 illustrates a set of waveforms corresponding to calibration and the time-shift element in a model according to an exemplary embodiment of the invention.

FIG. 6 shows a set of waveforms corresponding to calibration and the time-shift element in a model according to an exemplary embodiment. Waveform 50 represents a ramp input to a cell model. Waveform 52 corresponds to a response obtained through SPICE or HSPICE simulation. Waveform 54 represents a response obtained from an uncalibrated model. Waveform 56 corresponds to the response of a model adjusted with an internal capacitor. Waveform 58 represents the response of the final, calibrated model. The waveforms correspond to the characterization of a four-input NAND gate.

Once one has constructed a basic model, one may develop a noise immunity filter. To do so, one first creates a noisy input signal (one that is suitable or appropriate for the design and technology, as persons of ordinary skill in the art with the benefit of this description understand).

In order to calculate a suitable noise immunity filter, a noisy input signal should produce some noise at the output pin (if the cell is capable of exhibiting noise). If an appropriate input waveform is not used, the noise immunity filter may not fully or accurately represent the intrinsic noise immunity of the cell. The noisy waveform should be used as an input in a SPICE simulation run to examine a resulting noisy output on pin Y.

Figure 7:
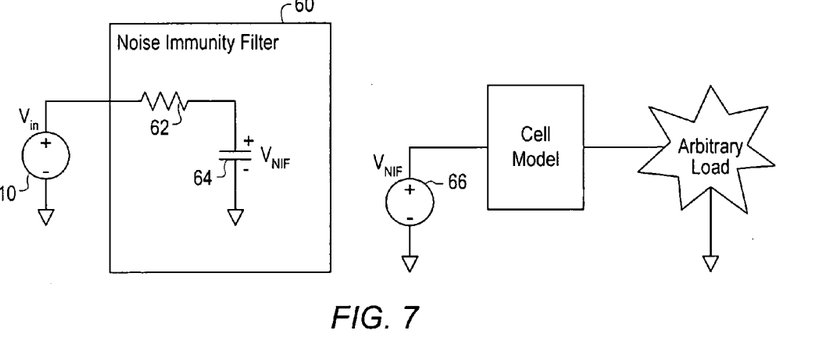
FIG. 7 shows a noise immunity filter used in conjunction with a model according to the invention.

Next, one applies the noisy input to a filter and uses the resulting voltage to feed the cell model. In exemplary embodiments, the filter constitutes an RC filter. FIG. 7 shows a noise immunity filter 60 used in conjunction with a model as described herein. Noise immunity filter 60 includes resistor 62 and capacitor 64. Output of noise immunity filter 60, $V_{INF}$, drives the cell model via voltage-controlled voltage source 66.

One may increase or decrease the RC time constant (by varying the resistance value, the capacitance value, or both) until the model output matches or tends to match the SPICE output. Note that one may alter the time-shift element to account for delays associated with the noise immunity filter.

Given a single RC filter, one may alter the RC time constant and then decide how to represent this constant as independent resistance (R) and capacitance (C) values. This property results because two RC filters are equivalent if the RC products match, even if the two R and two C values do not match one another.

Once one has calibrated the noise immunity filter, one may recalculate the time-shift element. The presence of the noise immunity filter acts as a delay element, so one alters the time-shift element accordingly, as desired.

Note that one may implement the noise immunity filter between the internal capacitance (the internal capacitance is part of the filter circuit) and the load at the output of the cell, as desired. In that situation, one may use a similar process to calculate a resistance value. Note further that the noise immunity filter represents one technique for accounting for the effects of noise. As persons of ordinary skill in the art with the benefit of this description understand, however, one may apply a different technique (i.e., other than the noise immunity filter) to take into account the inherent noise immunity exhibited by some cells, as desired.

In a multi-stage cell, one calibrates the first stage differently from the above procedure. For example, with respect to a two-stage cell, in the SPICE run, the first stage is only loaded with the second stage (while the second stage is loaded with a capacitor). The first stage model is then created by matching the output of the model to the first stage using the normal procedure. One need not employ a time-shift element in this step because one can add the time-shift element to the time-shift element of the second stage. One models the second stage in the usual or normal manner described above.

In a multi-stage model, the load is fixed for all stages except for those stages that drive output pins. For example, consider an OR gate consisting of a NOR stage driving an inverter (INV). The NOR stage does not drive anything other than the INV. The INV stage, however, drives any load placed on the output of the cell. Thus, to calibrate the NOR, one loads it with the INV stage (during the SPICE portion of calibration), not with a capacitor. Note that one loads the INV stage with a suitable or appropriate capacitive load.

From the SPICE run, one determines an internal capacitor with which to load the NOR stage model. As noted above, one need not calculate a time-shift element. Next, one calibrates the INV stage model. For this calibration, one may use the same SPICE run used to calibrate the NOR stage. In other words, one may use a single SPICE run in which one loads the OR gate with a capacitor and extract voltage waveforms at the output of the NOR stage and the INV stage simultaneously.

For the INV stage model, one performs the normal internal capacitance calculation, described above. Note, however, that the time-shift element is the time-shift element that calibrates the OR gate to the combination of models of the NOR and INV stages.

In large macros consisting of many stages, one need model only the output stage for arbitrary loads. All internal stages have fixed loads (i.e., other internal stages). Note that, for larger models, one may focus on the output stage exclusively, as desired. As the size of the logic block grows, the shape of the input waveform has less and less of an impact on the output waveform shape, thus limiting the impact to that of a time-shift element consideration.

One may evaluate (or solve) the present models in a relatively easy manner. In fact, the calibration step involves model evaluation using various internal capacitance values (excluding the time-shift element). Given a load to be driven at the output pin and a voltage waveform at the input pin, model evaluation entails the steps described below.

Based on the input voltage ($V_{in}$) at a given time point and an estimated voltage at the output ($V_{out}$), the current provided by the voltage-controlled current source is determined. Note that, unlike traditional voltage-controlled current sources, this source uses two voltages to determine the current flow (three voltages if the model was created for two input pins switching simultaneously, etc.).

This current is applied to the arbitrary load and internal capacitance to determine the calculated voltage at the output ($V_{out}$). If the $V_{out}$ guess in the first step above matches the calculated $V_{out}$ in the second step (by some tolerance), an output voltage has been established for that time point. Otherwise, one iterates back to the first step and uses a new guess for $V_{out}$. A variety of nonlinear solvers (like secant iteration) can be used to refine the guesses for $V_{out}$ until convergence is achieved.

Next, the value for $V_{out}$ is recorded and one increments to the next time point. After the output voltage ($V_{out}$) has been determined for the time period for which $V_{in}$ was applied, one shifts the $V_{out}$ waveform in time by using the time-shift element associated with the model, as described above.

The sweeps of $V_{in}$ and $V_{out}$ can exceed $V_{SS}$ and $V_{DD}$. In other words, one may sweep both $V_{in}$ and $V_{out}$ from $-VDD$ to $2V_{DD}$. Doing so helps to determine the current flow when $V_{in}$ and $V_{out}$ are outside of normal bounds (for example, in the event that some noise exists on the input or output lines).

The presence of a noise immunity filter impacts this process in one of two ways, depending upon the form of the filter. If the filter consists of a simple RC circuit that preprocesses $V_{in}$, one drives the filter with the input voltage ($V_{in}$) to determine the voltage present across the capacitor of the filter. One uses this new voltage waveform as the input to the cell model. If, however, the filter consists of a resistor between the internal capacitor and the load being driven, one simply includes the resistor in the calculation of $V_{out}$ in the process described above.

As noted above, one may use models as described herein to perform power analysis of cells and circuit. One may perform the power analysis as a post-processing step, as desired, by using the cell output current. Once the values for $V_{out}$ have been calculated, one may index and fill tables of current values (for $V_{SS}$ and $V_{DD}$) using the known values for the output current and $V_{in}$ and $V_{out}$.

The output current represents the current that was supplied to the cell by the power and ground sources in order to achieve that output voltage, given the input voltage and load (neglecting the small leakage currents, etc.). Thus, one simply looks up the current values for each time point in order to perform power calculation. To calculate power, one multiplies the voltage values (supply voltages) by the current values.

Note that the present models are valid even if the output of a cell does not make a transition in response to the input stimulus. Thus, power calculations using the models is valid under those circumstances.

One may make a variety of modifications to the exemplary models described here in order to accommodate a wide range of circuit characterization situations. For example, although the description of the models refers to a single input pin to a single output pin in a gate, more complex descriptions can be created to represent multiple inputs and/or multiple outputs. The voltage-controlled current source in such cases would be an equation or table that uses more variables than the input and output voltages to determine the current flow. Also, in such cases, one would consider the multiple input pins when performing calibration.

One need not always use the time-shift element in models. As noted above, a simple (additive) time-shift element can calculate a cell's response relatively accurately. By including the noise immunity filter (even when the input voltage is not noisy), however, one may eliminate the time-shift element, as desired.

Cell characterization may sometimes entail consideration of voltage drops as a result of current flow (i.e., IR drops). One may account for IR drops in models described herein, as desired. More specifically, one may appropriately sweep $V_{SS}$ and $V_{DD}$ values during the DC analysis stage to account for the IR drops (given a knowledge or characterization of the parasitic values, such as the resistance values).

Another aspect relates to modeling interconnect within electronic circuits. Given an arbitrary voltage waveform to be propagated through a conductor (wire or coupling mechanism), and a set of poles and residues (or moments) associated with destination points along the conductor, characterization techniques may provide a way of calculating voltage waveforms observed at the destination points or nodes. Interconnect models according to exemplary embodiments help to analyze electrical signals that result when a driver stage or circuit provides voltage and/or current to an interconnect.

Interconnect modeling, for instance, integrated circuit (IC) interconnect modeling, addresses the problem of propagating a voltage waveform from a driving cell at one end of the interconnect to one or more cells at the other end of the interconnect being driven. The interconnect is typically represented by a resistor/capacitor network (a tree or mesh), though inductance(s) may also be present in the network.

A voltage waveform, created by the driver or driving cell, propagates through the interconnect to the input pins of the cell(s) being driven. The shape of the voltage waveforms at each sink (input terminal of the cell(s) being driven) and the relative timing of the waveform (with respect to the waveform at the driving cell) are used to help determine the overall performance of the circuit or IC.

Recursive convolution is a technique that one may use to determine the voltage response at a sink by using the pole/residue formation associated with a particular driver-sink combination or configuration (with the intervening interconnect). To use recursive convolution, one typically describes the input waveform(s) by using a series of line segments (called piecewise linear approximation or PWL).

Recursive convolution, as well as other analysis techniques developed since its introduction, are relatively slow to provide efficient analysis of interconnect for arbitrary voltage waveforms. More specifically, recursive convolution and other techniques are unable to efficiently analyze interconnect for PWL descriptions containing more than a reasonable number of line segments (say, 10, 20, or 50 line segments).

In contrast, the interconnect analysis and characterization concepts described herein are relatively efficient, even for PWLs consisting of thousands of line segments, in some embodiments. The interconnect analysis and characterization concepts achieve the efficiency with relatively high accuracy. In other words, they provide an efficient solution that does not sacrifice accuracy.

Consider a saturated linear ramp (i.e., a ramp that rises from the $V_{SS}$ level to the $V_{DD}$ level with a line segment that has slope A, and then flattens at $V_{DD}$). Suppose that the ramp drives an interconnect that consists of resistors and capacitors. Using recursive convolution, one may calculate the voltage at a desired time t by using Equation 1 below:

$$v(t) = \begin{cases} A\left[t - \sum_{i=1}^{n} \frac{k_i}{p_i}(1 - e^{p_i t})\right] & t < \tau \\ A\left[t - \sum_{i=1}^{n} \frac{k_i}{p_i}(1 - e^{p_i t})\right] - A\left[(t - \tau) - \sum_{i=1}^{n} \frac{k_i}{p_i}(1 - e^{p_i(t-\tau)})\right] & t \geq \tau \end{cases}$$

The saturated liner ramp driving the interconnect starts at $V_{SS}$ at time 0 and linearly increases (with slope A) to $V_{DD}$ at time τ. After that time, the input voltage remains constant at $V_{DD}$. The poles and residues correspond to a target point in the interconnect that one desires to analyze.

Figure 8:
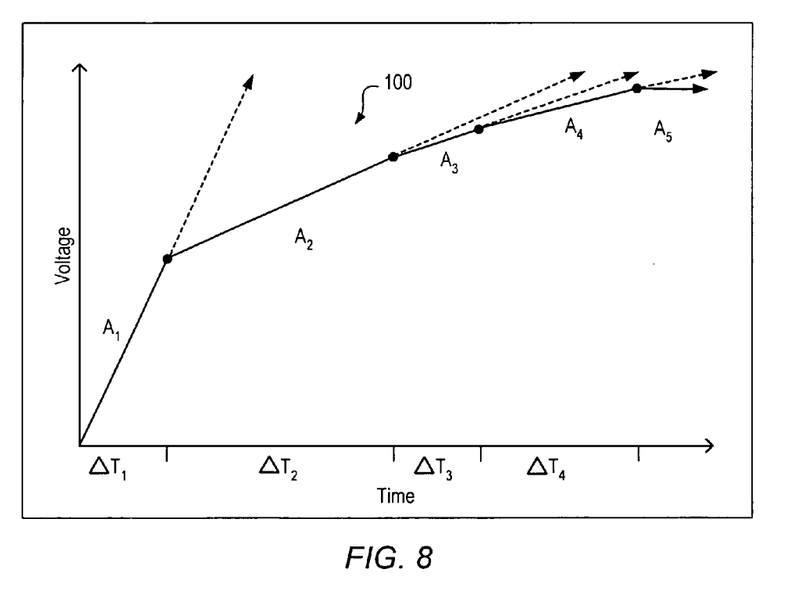
FIG. 8 depicts a waveform, having multiple line segments, used to drive an interconnect in an electronic circuit.

Now consider a waveform that includes more line segments. FIG. 8 shows a waveform 100, having multiple line segments, used to drive an interconnect in an electronic circuit. Waveform 100 consists of several linear segments of various slopes (i.e., A1, A2, etc.). The last slope, A5, represents the flat portion of the input voltage when it reaches the $V_{DD}$ level.

Recursive convolution can be used to determine the voltage at the destination point, but in a relatively inefficient manner. Equation 2 below provides an expression for voltages at various time points by using poles and residues for the destination, the slopes of the line segments, and the times that these slopes take effect (only the first 3 segments are presented here):

$$v(0) = 0$$

$$v(\Delta t_1) = A_1\left[\Delta t_1 - \sum_{i=1}^{n} \frac{k_i}{p_i}(1 - e^{p_i \Delta t_1})\right]$$

$$v(\Delta t_1 + \Delta t_2) = A_1\left[(\Delta t_1 + \Delta t_2) - \sum_{i=1}^{n} \frac{k_i}{p_i}(1 - e^{p_i(\Delta t_1 + \Delta t_2)})\right] + (A_2 - A_1)\left[\Delta t_2 - \sum_{i=1}^{n} \frac{k_i}{p_i}(1 - e^{p_i \Delta t_2})\right]$$

$$v(\Delta t_1 + \Delta t_2 + \Delta t_3) = A_1\left[(\Delta t_1 + \Delta t_2 + \Delta t_3) - \sum_{i=1}^{n} \frac{k_i}{p_i}(1 - e^{p_i(\Delta t_1 + \Delta t_2 + \Delta t_3)})\right] + (A_2 - A_1)\left[(\Delta t_2 + \Delta t_3) - \sum_{i=1}^{n} \frac{k_i}{p_i}(1 - e^{p_i(\Delta t_2 + \Delta t_3)})\right] + (A_3 - A_2)\left[\Delta t_3 - \sum_{i=1}^{n} \frac{k_i}{p_i}(1 - e^{p_i \Delta t_1})\right].$$

If the interconnect consists of resistors, capacitors, and inductors, the expression for the voltage becomes even more complex. Equation 3 below provides an expression for the voltage when the interconnect consists of resistors, capacitors, and inductors:

$$k_j = a_j + b_j i$$
$$p_j = c_j + d_j i$$

$$v(\Delta t_1) = A_1\left[\Delta t_1 - \sum_{j=1}^{n} \frac{a_j}{c_j} + \sum_{j=1}^{n} e^{c_j \Delta t_1}\left(\frac{a_j}{c_j}\cos(d_j \Delta t_1) - \frac{b_j}{d_j}\sin(d_j \Delta t_1)\right)\right]$$

In contrast to recursive convolution, interconnect analysis and characterization models may use uniform time steps between points in the PWL description of the input signal. This methodology does not pose a severe restriction (or poses a relatively minor loss of accuracy) because a PWL description with non-uniform time steps can always be converted into one with a constant time step by choosing an appropriate time step.

Figure 9:
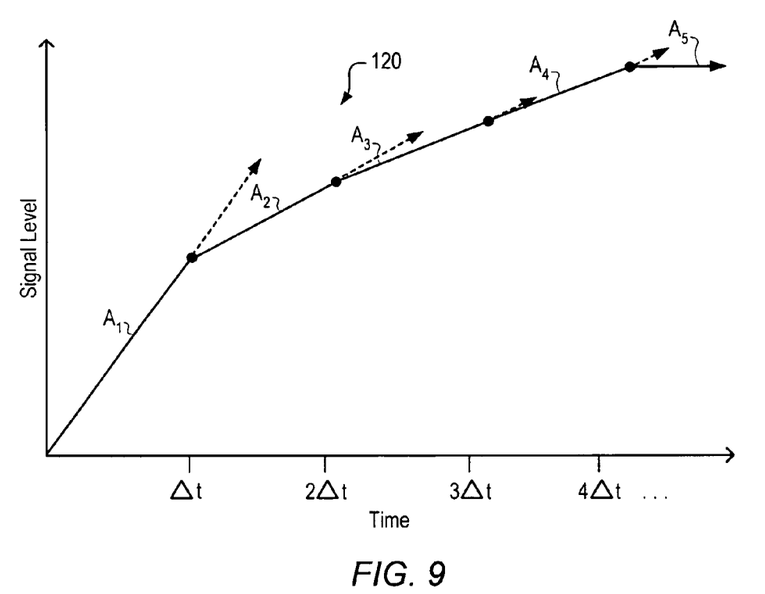
FIG. 9 shows a waveform, having multiple line segments, used to drive an interconnect model in an illustrative embodiment according to the invention.

FIG. 9 shows a waveform 120, having multiple line segments, used to drive an interconnect model in an illustrative embodiment. Note that slopes A1, A2, etc., correspond to the slope of waveform 120 at various times (e.g., slope A1 corresponds to the time period from zero to Δt, etc.). The last slope (slope A5 in the illustrative waveform shown in FIG. 9) corresponds to the portion of the input waveform at and after the point in time when it reaches the $V_{DD}$ level (slope of zero).

The term Δt corresponds to a fixed time step. In other words, one may express the input or driving signal, d(t), as:

$$d(t) = d_{in}(i\Delta t) = A_1 + (A_2 - A_1)(i-1)\Delta t + \ldots + (A_i - A_{i-1})\Delta t.$$

The signal d(t) constitutes a generalized input signal. It may constitute a variety of signals, as desired, for example, a voltage signal, a current signal, a composite signal, and the like, as persons of ordinary skill in the art who have the benefit of this description understand.

Equation 4 below provides an expression for the voltage signal v(t) (or generally, a signal d(t)) at a desired point or node along the interconnect:

$$v(0) = 0$$

$$v(\Delta t) = A_1\left[\Delta t - \sum_{i=1}^{n} \frac{k_i}{p_i}(1 - e^{p_i \Delta t})\right]$$

$$v(2\Delta t) = A_1\left[2\Delta t - \sum_{i=1}^{n} \frac{k_i}{p_i}(1 - e^{p_i 2\Delta t})\right] + (A_2 - A_1)\left[\Delta t - \sum_{i=1}^{n} \frac{k_i}{p_i}(1 - e^{p_i \Delta t})\right]$$

$$v(3\Delta t) = A_1\left[3\Delta t - \sum_{i=1}^{n} \frac{k_i}{p_i}(1 - e^{p_i 3\Delta t})\right] + (A_2 - A_1)\left[2\Delta t - \sum_{i=1}^{n} \frac{k_i}{p_i}(1 - e^{p_i 2\Delta t})\right] + (A_3 - A_2)\left[\Delta t - \sum_{i=1}^{n} \frac{k_i}{p_i}(1 - e^{p_i \Delta t})\right]$$

In equation 4, the interconnect has a transfer function with n poles (denoted as $p_i$) and n residues (denoted as $k_i$) of a sink node, where i ranges from one to n. Note that one may extend Equation 4 to any number of desired terms in a manner apparent to persons of ordinary skill in the art who have the benefit of this description.

By expanding the above equation, one can derive an expression for the voltage signal v(t) (or generally, a signal d(t)) at a desired point or nod by using partial sums.

Equation 5 provides an expression for the resulting partial sums in an illustrative embodiment, where $S_m$ represents a running partial sum:

$$v(t) = v(i\Delta t) \sum_{m=1}^{4} S_m(i\Delta t)$$

$$S_1(i\Delta t) = \sum_{j=1}^{i} A_j \Delta t = A_i \Delta t + S_1((i-1)\Delta t)$$

$$S_2(i\Delta t) = -A_i \left( \frac{k_1}{p_1} + \frac{k_2}{p_2} \right)$$

$$S_3(i\Delta t) = (A_i - A_{i-1}) \frac{k_1}{p_1} e^{p_1 \Delta t} + e^{p_1 \Delta t} S_3((i-1)\Delta t)$$

$$S_4(i\Delta t) = (A_i - A_{i-1}) \frac{k_2}{p_2} e^{p_2 \Delta t} + e^{p_2 \Delta t} S_4((i-1)\Delta t)$$

Given a constant time step, $\Delta t$, and given that the poles and residues associated with the destination are constant, many of the components of the equation may be pre-calculated. More specifically, because of the constant time steps, poles, and residues, one may pre-calculate the fractions and exponents in the equations above. In other words, one may pre-calculate the terms given by Equation 6 below:

$$v(t) = v(i\Delta t) = \sum_{n=1}^{4} S_n(i\Delta t)$$

$$c_1 = \frac{k_1}{p_1}$$

$$c_2 = \frac{k_2}{p_2}$$

$$c_3 = c_1 + c_2$$

$$c_4 = e^{p_1 \Delta t}$$

$$c_5 = c_1 c_4$$

$$c_6 = e^{p_2 \Delta t}$$

$$c_7 = c_2 c_6$$

$$S_1(i\Delta t) = \sum_{j=1}^{i} A_j \Delta t = A_j \Delta t + S_1((i-1)\Delta t)$$

$$S_2(i\Delta t) = -A_i c_3$$

$$S_3(i\Delta t) = (A_i - A_{i-1}) c_5 + c_4 S_3((i-1)\Delta t)$$

$$S_4(i\Delta t) = (A_i - A_{i-1}) c_7 + c_6 S_4((i-1)\Delta t)$$

Note that one may extend the calculations shown in Equation 6 to any number of desired terms in a manner apparent to persons of ordinary skill in the art who have the benefit of this description. Note further that, as an intermediate step, one may compute the quantity $(A_i - A_{i-1})$ before the last two steps shown in Equation 6 to save the extra lookup and math operations, as desired.

As a consequence of the pre-calculation, one may implement a relatively efficient and accurate interconnect analysis and characterization tool. Thus, using the inventive concepts, one may implement a technique to analyze or characterize interconnects with O(np) complexity, where n and p represent the number of time steps and the number of poles, respectively.

It is noted that the equation for $S_1$ given above may be simplified. It can be shown that $S_1$ may be expressed as follows (Equation 7):

$$S_1(i\Delta t) = v(i\Delta t) - v(0)$$

While the above example describes a fixed time step, other embodiments need not implement a fixed time step. That is, the size of the time step may vary from time point to time point. For a given time point, the corresponding time step may be the time step that was added to the immediately preceding time point to reach the given time point.

Having a variable time step size may provide additional flexibility for describing an input stimulus and/or a response. For example, during time intervals in which the stimulus or response is not rapidly changing, the time step size may be increased while maintaining reasonable accuracy, in some embodiments. During time intervals in which the stimulus or response is changing more rapidly, the time step size may be decreased to provide additional accuracy, in some embodiments.

An input stimulus described by a variable time step may be specified as a set of slopes and the time step size corresponding to each slope. The response waveform may be described by the same set of time step sizes, or by a set of time step sizes appropriate for the response wave form. The time step sizes may be user-selected, for example.

The equations for the partial sums, when a variable time step is used, may be as shown below for two poles and residues (Equation 8):

$$v(t_i) = \sum_{m=1}^{4} S_m(t_i)$$

$$S_1(t_i) = \sum_{j=1}^{i} A_j \Delta t = A_i \Delta t + S_1(t_{i-1}) = v(t_i) - v(0)$$

$$S_2(t_i) = -A_i \left( \frac{k_1}{p_1} + \frac{k_2}{p_2} \right)$$

$$S_3(t_i) = (A_i - A_{i-1}) \frac{k_1}{p_1} e^{p_1 \Delta t_i} + e^{p_1 \Delta t_i} S_3(t_{i-1})$$

$$S_4(t_i) = (A_i - A_{i-1}) \frac{k_2}{p_2} e^{p_2 \Delta t_i} + e^{p_2 \Delta t_i} S_4(t_{i-1}) \text{ where}$$

$$\Delta t_i = t_i - t_{i-1}$$

The slopes $A_i$ may also be calculated based on the variable time step as well.

The above embodiments for interconnect analysis may operate in batch mode, in which the response is calculated for the entire desired range of time and the result is made available to the user upon completion. Additionally, the embodiments may operate in an incremental mode in which each time point is calculated and calculation of the next time point is performed under user control.

Note that one may extend the concepts described above to situations where the interconnect model includes inductors (as well as resistors and capacitors), as desired, and as persons of ordinary skill in the art who have the benefit of this description understand. Although the addition of inductance(s) introduces additional terms in the expressions for the signals, one may apply the same principles (constant time steps to describe the PWL waveform and partial running sums to compute the signals).

Furthermore, although the above examples show two poles and residues with no imaginary components, one may extend and apply the inventive concepts to situations that entail an y number of imaginary poles and zeros, as desired, by making appropriate modifications to the equations presented above. Those modifications that fall within the knowledge of persons of ordinary skill in the art who have the benefit of this description.

Figure 10:
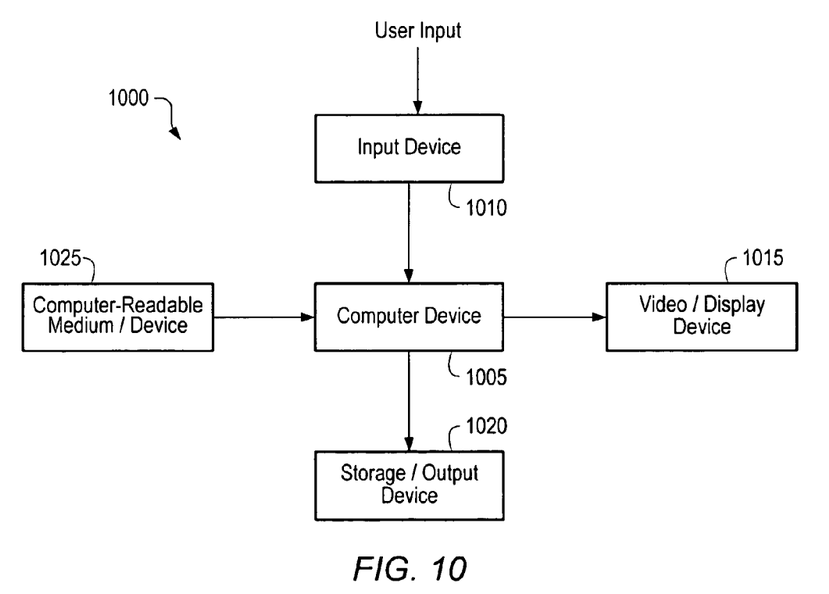
FIG. 10 illustrates a block diagram of a system for processing information according to the invention.

To characterize a given circuit (including cells, interconnect, etc.) using the inventive concepts, one typically uses a computer system that processes information relating to that circuit. FIG. 10 shows a block diagram of a system 1000 for processing information for one embodiment. The system 1000 includes a computer device 1005, an input device 1010, a video/display device 1015, and a storage/output device 1020, although one may include more than one of each of those devices, as desired. The computer device 1005 couples to the input device 1010, the video/display device 1015, and the storage/output device 1020. The system 1000 may include more that one computer device 1005, for example, a set of associated computer devices or systems, as desired.

The system 1000 operates in association with input from a user. The user input typically causes the system 1000 to perform specific desired information-processing tasks, including circuit characterization and/or circuit simulation. The system 1000 in part uses the computer device 1005 to perform those tasks. The computer device 1005 includes an information-processing circuitry, such as a central-processing unit (CPU), although one may use more than one CPU or information-processing circuitry, as persons skilled in the art would understand.

The input device 1010 receives input from the user and makes that input available to the computer device 1005 for processing. The user input may include data, instructions, or both, as desired. The input device 1010 may constitute an alphanumeric input device (e.g., a keyboard), a pointing device (e.g., a mouse, roller-ball, light pen, touch-sensitive apparatus, for example, a touch-sensitive display, or tablet), or both. The user operates the alphanumeric keyboard to provide text, such as ASCII characters, to the computer device 1005. Similarly, the user operates the pointing device to provide cursor position or control information to the computer device 1005.

The video/display device 1015 displays visual images to the user. The visual images may include information about the operation of the computer device 1005, such as graphs, pictures, images, and text. The video/display device may constitute a computer monitor or display, a projection device, and the like, as persons of ordinary skill in the art would understand. If a system uses a touch-sensitive display, the display may also operate to provide user input to the computer device 1005.

The storage/output device 1020 allows the computer device 1005 to store information for additional processing or later retrieval (e.g., softcopy), to present information in various forms (e.g., hardcopy), or both. As an example, the storage/output device 1020 may constitute a magnetic, optical, or magneto-optical drive capable of storing information on a desired medium and in a desired format. As another example, the storage/output device 1020 may constitute a printer, plotter, or other output device to generate printed or plotted expressions of the information from the computer device 1005.

The computer-readable medium 1025 interrelates structurally and functionally to the computer device 1005. The computer-readable medium 1025 stores, encodes, records, and/or embodies functional descriptive material. By way of illustration, the functional descriptive material may include computer programs, computer code, computer applications, and/or information structures (e.g., data structures or file systems). When stored, encoded, recorded, and/or embodied by the computer-readable medium 1025, the functional descriptive material imparts functionality. The functional descriptive material interrelates to the computer-readable medium 1025.

Information structures within the functional descriptive material define structural and functional interrelations between the information structures and the computer-readable medium 1025 and/or other aspects of the system 1000. These interrelations permit the realization of the information structures' functionality. Moreover, within such functional descriptive material, computer programs define structural and functional interrelations between the computer programs and the computer-readable medium 1025 and other aspects of the system 1000. These interrelations permit the realization of the computer programs' functionality.

By way of illustration, the computer device 1005 reads, accesses, or copies functional descriptive material into a computer memory (not shown explicitly in the figure) of the computer device 1005. The computer device 1005 performs operations in response to the material present in the computer memory. The computer device 1005 may perform the operations of processing a computer application that causes the computer device 1005 to perform additional operations. Accordingly, the functional descriptive material exhibits a functional interrelation with the way the computer device 1005 executes processes and performs operations.

Furthermore, the computer-readable medium 1025 constitutes an apparatus from which the computer device 1005 may access computer information, programs, code, and/or applications. The computer device 1005 may process the information, programs, code, and/or applications that cause the computer device 1005 to perform additional operations.

Note that one may implement the computer-readable medium 1025 in a variety of ways, as persons of ordinary skill in the art would understand. For example, memory within the computer device 1005 may constitute a computer-readable medium 1025, as desired. Alternatively, the computer-readable medium 1025 may include a set of associated, interrelated, or networked computer-readable media, for example, when the computer device 1005 receives the functional descriptive material from a network of computer devices or information-processing systems. Note that the computer device 1005 may receive the functional descriptive material from the computer-readable medium 1025, the network, or both, as desired.

One may implement or use the inventive concepts in a variety of embodiments, as persons of ordinary skill in the art who have the benefit of this description understand. Referring to the figures, the various blocks shown depict mainly the conceptual functions and signal flow. The actual circuit implementation may or may not contain separately identifiable hardware, software, routines, algorithms, or the like, for the various functional blocks.

For example, one may combine the functionality of various blocks into one block, as desired. Furthermore, one may realize the functionality of a single block in several blocks, as desired. The choice of implementation depends on various factors, such as particular design and performance specifications for a given implementation, as persons of ordinary skill in the art who have the benefit of this description understand.

Other modifications and alternative embodiments in addition to the embodiments described here will be apparent to persons of ordinary skill in the art who have the benefit of this description. Accordingly, this description teaches those skilled in the art the manner of carrying out the invention and the embodiments described are to be construed as illustrative only. As persons of ordinary skill in the art with the benefit of this description understand, one may make many modifications to the circuit arrangements described here and shown in the accompanying figures, as desired, without departing from the inventive concepts.

Furthermore, persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description may use certain features independently of the use of other features, without departing from the scope of the invention.

What is claimed is:

1. A system comprising a computer configured to:
   generate a plurality of partial sums corresponding to a first time point of a response on an interconnect, wherein the plurality of partial sums are a function of at least: one or more poles and residues of the interconnect and a time step; wherein at least a first partial sum of the plurality of partial sums corresponding to the first time point is also a function of the first partial sum calculated for a second time point that precedes the first time point; and
   generate the response at the first time point as a sum of the plurality of partial sums corresponding to the first time point.

2. The system as recited in claim 1 wherein a size of the time step is variable from time point to time point.

3. The system as recited in claim 1 wherein the first time point and the second time point are included in a plurality of time points in the response, and wherein the computer is configured to generate the partial sums corresponding to each time point of the plurality of time points, wherein at least the first partial sum at the time point is also a function of the first partial sum at a preceding time point of the plurality of time points, and wherein the computer is configured to generate the response at each time point as a sum of the plurality of partial sums at each time point.

4. The system as recited in claim 1 wherein the response is caused by a stimulus input to an interconnect model corresponding to the interconnect, and wherein the stimulus comprises a piecewise linear signal.

5. The system as recited in claim 1 wherein the response comprises a voltage.

6. The system as recited in claim 1 wherein the interconnect is modeled as a network comprising one or more resistances and one or more capacitances.

7. The system as recited in claim 6 wherein the network further comprises one or more inductances.

8. A computer readable medium storing a plurality of instructions which, when executed, implement a method comprising:
   generating a plurality of partial sums corresponding to a first time point of a response on an interconnect, wherein the plurality of partial sums are a function of at least: one or more poles and residues of the interconnect and a time step; wherein at least a first partial sum of the plurality of partial sums corresponding to the first time point is also a function of the first partial sum calculated for a second time point that precedes the first time point; and
   generating the response at the first time point as a sum of the plurality of partial sums corresponding to the first time point.

9. The computer readable medium as recited in claim 8 wherein a size of the time step is variable from time point to time point.

10. The computer readable medium as recited in claim 8 wherein the first time point and the second time point are included in a plurality of time points describing the response, and wherein the method further comprises generating the partial sums corresponding to each time point of the plurality of time points, wherein at least the first partial sum at the time point is also a function of the first partial sum at a preceding time point of the plurality of time points, and wherein the method further comprises generating the response at each time point as a sum of the plurality of partial sums at each time point.

11. The computer readable medium as recited in claim 8 wherein the response is caused by a stimulus input to an interconnect model corresponding to the interconnect, and wherein the stimulus comprises a piecewise linear signal.

12. The computer readable medium as recited in claim 8 wherein the interconnect is modeled as a network comprising one or more resistances and one or more capacitances.

13. The computer readable medium as recited in claim 12 wherein the network further comprises one or more inductances.

14. The computer readable medium as recited in claim 8 wherein the response comprises a voltage.

15. A method comprising:
   generating a plurality of partial sums corresponding to a first time point of a response on an interconnect, wherein the plurality of partial sums are a function of at least: one or more poles and residues of the interconnect and a time step; wherein at least a first partial sum of the plurality of partial sums corresponding to the first time point is also a function of the first partial sum calculated for a second time point that precedes the first time point; and
   generating the response at the first time point as a sum of the plurality of partial sums corresponding to the first time point.

16. The method as recited in claim 15 wherein a size of the time step is variable from time point to time point.

17. The method as recited in claim 15 wherein the first time point and the second time point are included in a plurality of time points in the response, and wherein the method further comprises generating the partial sums corresponding to each time point of the plurality of time points, wherein at least the first partial sum at the time point is also a function of the first partial sum at a preceding time point of the plurality of time points, and wherein the method further comprises generating the response at each time point as a sum of the plurality of partial sums at each time point.

18. The method as recited in claim 15 wherein the response is caused by a stimulus input to an interconnect model corresponding to the interconnect, and wherein the stimulus comprises a piecewise linear signal.

* * * * *